US012143170B2

(12) United States Patent
Moton, Jr. et al.

(10) Patent No.: US 12,143,170 B2
(45) Date of Patent: Nov. 12, 2024

(54) NEAR-FIELD COMMUNICATION ENABLED LUGGAGE ITEM STOWAGE BINS

(71) Applicant: AT&T Intellectual Property I, L.P., Atlanta, GA (US)

(72) Inventors: Robert T. Moton, Jr., Alpharetta, GA (US); Adrianne Binh Luu, Atlanta, GA (US); James Pratt, Round Rock, TX (US); Barrett Kreiner, Woodstock, GA (US); Walter Cooper Chastain, Atlanta, GA (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 66 days.

(21) Appl. No.: 17/330,766

(22) Filed: May 26, 2021

(65) Prior Publication Data
US 2022/0383709 A1  Dec. 1, 2022

(51) Int. Cl.
*H04B 5/77* (2024.01)
*B64D 11/00* (2006.01)
*G08B 5/36* (2006.01)
*H04B 5/72* (2024.01)

(52) U.S. Cl.
CPC .............. *H04B 5/77* (2024.01); *B64D 11/003* (2013.01); *G08B 5/36* (2013.01); *H04B 5/72* (2024.01)

(58) Field of Classification Search
CPC .. H04B 5/0062; H04B 5/0031; B64D 11/003; G08B 5/36
See application file for complete search history.

(56) References Cited

U.S. PATENT DOCUMENTS

| | | | | |
|---|---|---|---|---|
| 9,204,257 B1* | 12/2015 | Mendelson | ........... | H04W 4/024 |
| 2002/0014955 A1* | 2/2002 | Klitsgaard | ............. | G06K 19/04 |
| | | | | 340/10.5 |
| 2007/0182565 A1* | 8/2007 | Lee | ................... | G06K 19/07703 |
| | | | | 340/572.8 |
| 2007/0222587 A1* | 9/2007 | Crider | .................... | G06Q 10/08 |
| | | | | 340/539.13 |
| 2011/0311052 A1* | 12/2011 | Myers | ..................... | H04L 63/10 |
| | | | | 380/270 |
| 2014/0077952 A1* | 3/2014 | Boss | .................. | G06Q 10/0832 |
| | | | | 340/572.1 |

(Continued)

OTHER PUBLICATIONS

Michael Velichko, "How Augmented Reality is Used in Commercial Aviation", downloaded from https://jasoren.com/augmented-reality-in-commercial-aviation/ on Feb. 19, 2021, 15 pages.

(Continued)

*Primary Examiner* — Omer S Khan (57) ABSTRACT

A processing system of a carrier transport vehicle including at least one processor may obtain a notification of a luggage item to be placed in a stowage bin of the carrier transport vehicle, the notification including an identifier of the luggage item, detect, via the identifier of the luggage item, that the luggage item is proximate to the stowage bin, where the identifier of the luggage item is obtained via a wireless signal from the luggage item, and present at least one visual indicator associated with the stowage bin, in response to the detecting that the luggage item is proximate to the stowage bin.

20 Claims, 5 Drawing Sheets

(56) References Cited

U.S. PATENT DOCUMENTS

2018/0111698 A1* 4/2018 Podnar ................. G06Q 10/043
2018/0146045 A1* 5/2018 Kang ..................... H04W 8/24

OTHER PUBLICATIONS

"Virtual Reality for Retail in the USA", NEC, Feb. 28, 2021, downloaded from https://www.NEC.com/en/global/insights/article/2020022509/index.html, 7 pages.

Roger Strukhoff, et al., "IoT for Airlines: Smart Baggage Tracking with RFID and Cloud Foundry", Sep. 5, 2016, Altoros Blog, 13 pages.

Amstelveen, "KLM Launches Augmented Reality for hand baggage check", Sep. 7, 2018, downloaded from https://news.klm.com/klm-launches-augmented reality-for-hand-baggage-check/, 3 pages.

* cited by examiner

NEAR-FIELD COMMUNICATION ENABLED LUGGAGE ITEM STOWAGE BINS

The present disclosure relates generally to carrier transport vehicle luggage item stowage systems and more particularly to apparatuses, computer-readable storage devices, and methods for presenting at least one visual indicator associated with a stowage bin in response to detecting that a luggage item is proximate to the stowage bin via an identifier of the luggage item obtained via a wireless signal from the luggage item.

BACKGROUND

Despite passenger air travel being ubiquitous for decades, many passengers still (or increasing) perceive the experience as stressful and anxiety-inducing, rather than as an enjoyable luxury. Current procedures of many airlines, especially relating to carry-on baggage and boarding, may be a significant source of passengers' negative perception of an overall journey.

SUMMARY

In one example, the present disclosure describes an apparatus, non-transitory computer-readable storage device, and method for presenting at least one visual indicator associated with a stowage bin in response to detecting that a luggage item is proximate to the stowage bin via an identifier of the luggage item obtained via a wireless signal from the luggage item. For instance, in one example, a processing system of a carrier transport vehicle including at least one processor may obtain a notification of a luggage item to be placed in a stowage bin of the carrier transport vehicle, the notification including an identifier of the luggage item, detecting, via the identifier of the luggage item, that the luggage item is proximate to the stowage bin, where the identifier of the luggage item is obtained via a wireless signal from the luggage item, and present at least one visual indicator associated with the stowage bin, in response to the detecting that the luggage item is proximate to the stowage bin.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Despite passenger air travel being ubiquitous for decades, many passengers still (or increasing) perceive the experience as stressful and anxiety-inducing, rather than as part of an enjoyable trip. Current procedures of many airlines, especially relating to carry-on baggage and boarding, may be a significant source of passengers' negative perceptions of overall journeys. In addition, passengers of other transportation modalities may have similar negative experiences or perceptions relating to stowage of luggage items onboard trains, buses, ferries, or other carrier transport vehicles where space for passengers and luggage items is limited and/or at a premium.

Examples of the present disclosure provide for improved and efficient management of luggage items transported onboard a carrier transport vehicle along a route with regard to inventory, packing, storing, transport, and other aspects of a journey. In particular, in one example, a user (e.g., a passenger) may be equipped with a wireless device, and may have one or more luggage items that may be equipped with electronic identification tags. In one example, each of the electronic identification tags may include a display, software, a transceiver or transponder for communication and/or wireless sensing via a near-field communication (NFC) and/or wide area network (WAN) connection. In one example, the electronic identification tag may store data related to the luggage item, such as: a user identifier (ID), an ID of the luggage item, a description of the luggage item, exterior dimensions of the luggage item, color of the luggage item, maximum weight capacity of the luggage item, and other data such as whether the luggage item is rigid or compactible to a degree. This data may represent a profile for the luggage item, which may be sent to and stored in a luggage item management database. This may, for instance, be stored in a passenger record maintained by an airline or other carriers, which may include a luggage item profile for a plurality of luggage items associated with the user. Alternatively, or in addition, such information may be stored in a luggage item management database maintained by another entity, which may provide such data to an airline or other carriers in connection with particular trips of the user.

In accordance with the present disclosure, when a user books a trip with a carrier, the user may also book a "ticket" for one or more luggage items (e.g., for carry-on bags or other luggage items). The user may do so during the initial reservation process or may do so after the passenger reservation has been made. When a "ticket" or reservation for a luggage item is made, the reservation may be stored in a reservation database, e.g., of a carrier reservation system, and may also be sent to the user's wireless device where it may be accessible, or it may be retrieved by the user from the reservation database, for example, via an application (app) provided by the carrier and operating on the user's wireless device. When the reservation is made, or afterwards, the user may be presented, e.g., via the app, with selectable items from the user's luggage item profile. The user may select one or more luggage items to include for the trip. For instance, if the user selects his or her black rolling bag, the carrier's reservation system may send an "electronic ticket" to the electronic identification tag that may be used by the luggage item (e.g., the electronic identification tag thereof) during the trip. The "electronic ticket" may include, for example: flight number, destination, flight times, and other data relevant to the trip.

In one example, the user may select a location for the luggage item to be stowed onboard a plane or other carrier transport vehicles. This selection may result in a particular stowage location (e.g., a stowage bin) being recorded for the reservation and sent to the electronic identification tag. For instance, the stowage location may be recorded as "bin above seat 13C", or may specify a bin number. In one example, the reservation system may make a more precise identification of available space in bins based on other factors. For instance, when the user makes the reservation, the reservation system may prompt the user as to whether or not the luggage item may need to be accessed during the trip. If not, the reservation system may not need to limit stowage location choices to those near the passenger's (user's) seat.

Furthermore, the reservation system may make more precise decisions regarding available space based on the dimensions of the bag and available space within a bin, which may take into consideration other luggage items that have already reserved space in the bin. When a plurality of luggage items' dimensions are known, a spatial packing algorithm may also be applied to improve efficiency in the use of space within one or more bins. For instance, a user may make a reservation that guarantees that a luggage item will be stowed within three rows of the user's seat, where the reservation system may then optimize the stowage arrangement of various luggage items, subject to such a contrast, and/or constraints of the same or a similar nature with regard to luggage items of other passengers. In one example, the app may also present available floor stowage for the user's consideration and may determine whether a luggage item will fit into such a space based on stored dimensional data for the carrier transport vehicle and the known dimensions of the luggage item. Additionally, pricing variations for stowage locations may be offered based on the user's flexibility in travel schedule.

At a point in time after a reservation is made, a luggage item may have a weight sensor, for instance in a handle sensor, that may be used to measure the luggage item's weight. If the luggage item has an active "electronic ticket" in its electronic identification tag data, the luggage item (e.g., the electronic identification tag thereof) may send and continually update the reservation database with the weight of the luggage item for planning purposes such as weight distribution, fueling requirements, or carry-on baggage pricing.

When boarding the plane (or other carrier transport vehicles), as the user nears the stowage location reserved for the luggage item, the electronic identification tag of the luggage item may communicate with one or more on-board sensors to notify an on-board processing system (e.g., a computing system) of the presence of the luggage item. In one example, a display or other visual indicators may be presented to the user indicating the correct stowage location of the luggage item, such as an illumination indicating a stowage bin, or location within the stowage bin reserved for the luggage item, an indication of the user's name or other identifier, etc. In one example, when the passenger (user) arrives at the airport or other transit centers, the user may leave the luggage item at a collection point before security screening. In essence, the user may drop off any "checked" luggage items and also any "carry-on" luggage items (for which tickets/reservations and stowage locations are stored on the electronic identification tag(s)). The carry-on luggage items may then be transported to the gate by airline personnel, thereby relieving the user of the need to go through screening and maintain possession of the luggage items.

Alternatively, the luggage items may be pre-stowed according to their stowage locations prior to boarding by the passengers. To facilitate pre-stowage of "carry-on" luggage items, carrier personnel may be equipped with augmented reality (AR) endpoint devices, such as AR glasses. This may enable the personnel to see an AR projection when looking at a luggage item based on a broadcast or transmission by the electronic identification tag of the luggage item of the stowage location, and other information, such as the luggage item ID as stored on the electronic identification tag, the name of the user/passenger associated with the luggage item, etc. In one example, marker-based AR reckoning may be used to identify the location on the plane (or other carrier transport vehicles) and to provide a visual indicator at the correct location, such as an illumination, text display, and so forth. In one example, an AR endpoint device may present an image that represents the size and shape of the luggage item at the intended location. The orientation of the AR shape may assist the personnel in knowing how best to stow the luggage item. These indicators may also be used to indicate to a robot where to place luggage items prior to passenger boarding.

The transit of luggage items from a user's point of origin (such as the user's home) to a specific stowage location (e.g., a stowage bin, or slot/location in stowage bin) may also be facilitated. For instance, after a luggage obtains a ticket/reservation, the luggage item may be picked up, for instance at the home, and delivered to the stowage location as described herein. In addition, a similar process may be applied when stowing luggage items in a cargo area of the carrier transport vehicle. For instance, if passengers pay a premium to have their bags first off the plane on arrival, those bags may be stowed in a designated area of the cargo space so that they arrive among the first bags delivered to a baggage claim area, or to another specified priority pickup zone. These and other aspects of the present disclosure are described in greater detail below in connection with the examples of FIGS. 1-5.

Figure 1:
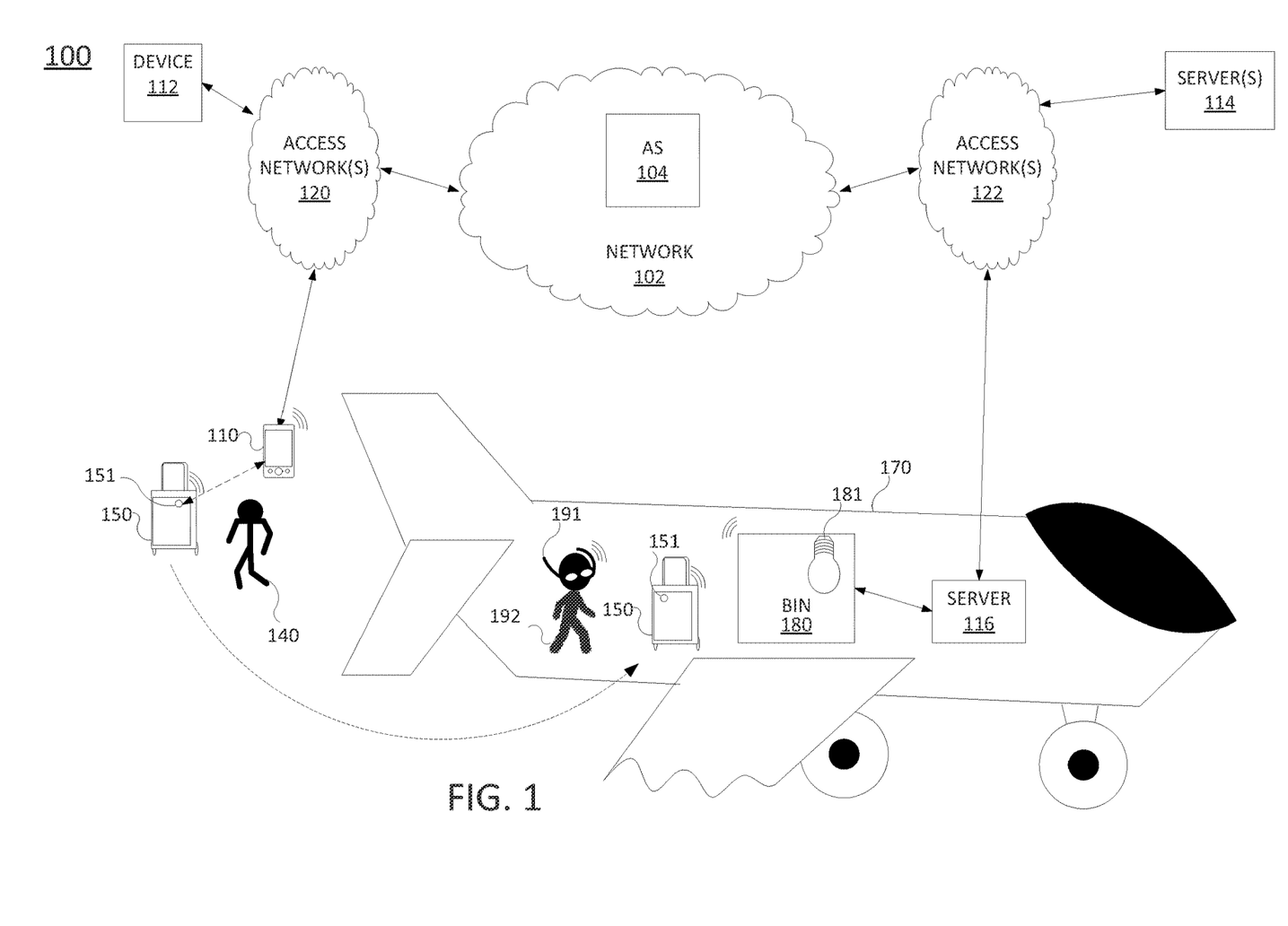
FIG. 1 illustrates an example system comprising one or more communication networks related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute of Electrical and Electronics Engineers (IEEE) 802.11/Wi-Fi network and the like), cellular access networks, $3^{rd}$ party networks, and the like. For example, the operator of network 102 may provide a broadband Internet access service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like.

In one example, the access networks 120 may be in communication with one or more devices 110 and 112. Similarly, access networks 122 may be in communication with one or more devices, e.g., servers 114 and 116. Access networks 120 and 122 may transmit and receive communications between devices 110 and 112, servers 114 and 116, application server (AS) 104 and/or other components of network 102, devices reachable via the Internet in general, and so forth. In one example, each of the devices 110 and 112 may comprise any single device or combination of devices that may comprise an endpoint device, e.g., a client device. For example, the devices 110 and 112 may each comprise a mobile device, a cellular smart phone, a laptop, a tablet computer, a desktop computer, a wearable computing device, an application server, a bank or cluster of such devices, an IoT device, and the like. However, it should be noted that in one example, device 112 may instead comprise a cloud desktop, or the like, wherein the "client device" may comprise network-based computing resources that are allocated to a user and which may provide for an operating system and a suite of applications which may provide similar functions to a desktop computer, a laptop computer, a mobile computing device, etc. In one example, device 110 and/or device 112 may be associated with a user 140 (e.g., a passenger) who may book a trip with a carrier (e.g., reserve a passenger seat, space, or other accommodations) and who may also reserve a stowage location for a luggage item 150. For instance, device 110 and/or device 112 may have a carrier app installed thereon, which may facilitate booking/reserving transport of passengers and/or luggage items by carrier transport vehicles scheduled for various routes.

In addition, in the example of FIG. 1, access network(s) 120 may also be in communication with an electronic identification tag 151 of a luggage item 150. Electronic identification tag 151 may include one or more radio frequency (RF) transceivers (as well as antenna(s), and/or other components) for cellular communications and/or for non-cellular wireless communications, such as for IEEE 802.11 based communications, IEEE 802.15 based communications, and so forth. In one example, electronic identification tag 151 may also include a module with one or more additional controllable components, such as an altimeter, a global positioning system (GPS) unit, an accelerometer, a gyroscope, a compass, a thermometer, a radiation sensor (e.g., an x-ray sensor), a microphone or acoustic sensor, and so forth. However, for ease of illustration, such components of electronic identification tag 151 may be omitted from FIG. 1. In addition, electronic identification tag 151 may include a data storage unit (e.g., a solid state drive (SDD) and/or a non-volatile memory (NVM), or the like), for storing a tag information record. For instance, the tag information record may include a user identifier (ID), an ID of the luggage item, a description of the luggage item, exterior dimensions of the luggage item, color of the luggage item, maximum weight capacity of the luggage item, and other data such as whether the luggage item is rigid or compactible to a degree, and so forth. In one example, the electronic identification tag 151 may communicate with device 110 and/or device 112, e.g., via NFC pairing/peer-to-peer communication. In one example, electronic identification tag 151 may be removable from luggage item 150 and may be used with different luggage items. Thus, in one example, prior to a particular trip, electronic identification tag 151 may be loaded with data that is specific to the trip, such as the user identify (e.g., if the electronic identification tag 151 is shared among family members), the particular luggage item (e.g., luggage item 150), the carrier, a flight, train, route number, and so on. In one example, the electronic identification tag 151 may also be loaded with stowage location reservation information, e.g., "bin above seat 13C" (which in the example of FIG. 1 may represent bin 180 of aircraft 170), and/or an electronic identifier of the bin 180.

However, it should also be noted that in one example, electronic identification tag 151 may comprise a passive radio frequency identification (RFID) tag, which may be loaded with relevant data prior to a journey (e.g., by a carrier). For instance, user 140 may obtain an RFID tag associated with a carrier, e.g., before or after booking travel. Thus, in one example, the RFID tag (e.g., electronic identification tag 151) may be affixed to luggage item 150 in advance of user 140 traveling to a transit center to embark (e.g., traveling to an airport to board a flight on board aircraft 170). In another example, such an RFID tag may be provided to user 140 to affix to luggage item 150 at check-in. In either case, the RFID tag may be associated with the luggage item 150 as well as the designated stowage location that has been reserved for luggage item 150, such as bin 180 on board of aircraft 170. In one example, the passive RFID tag may simply include a tag identifier (ID), where carrier infrastructure may sense the RFID tag and associate the tag ID with relevant information stored in a luggage item management system. However, in another example, the passive RFID tag may be loaded with additional data such that when scanned/sensed by carrier infrastructure, additional information may be made available to a scanning device without having to perform a server look-up.

Figure 4:
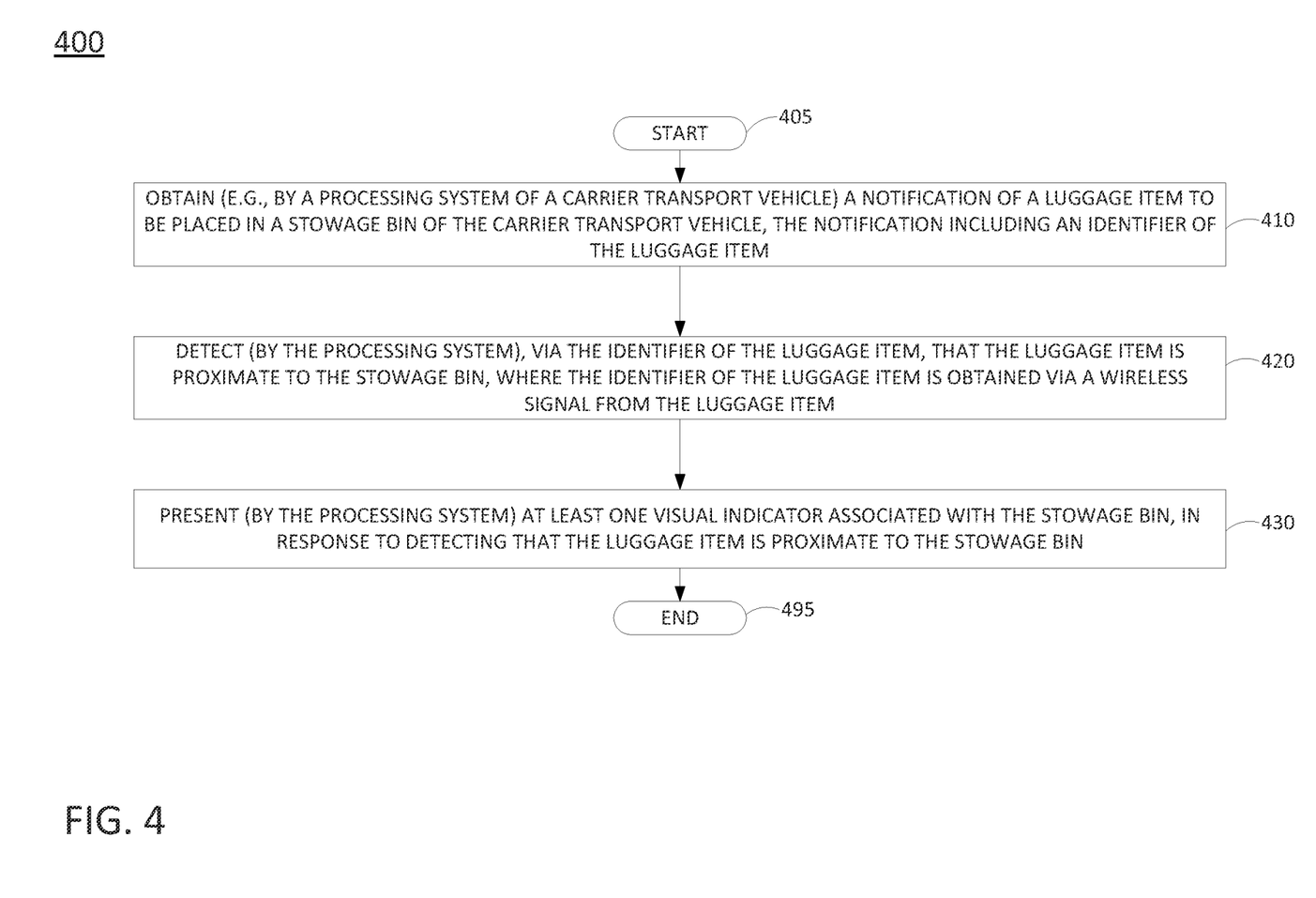
FIG. 4 illustrates a flowchart of an example method for presenting at least one visual indicator associated with a stowage bin in response to detecting that a luggage item is proximate to the stowage bin via an identifier of the luggage item obtained via a wireless signal from the luggage item.
Figure 5:
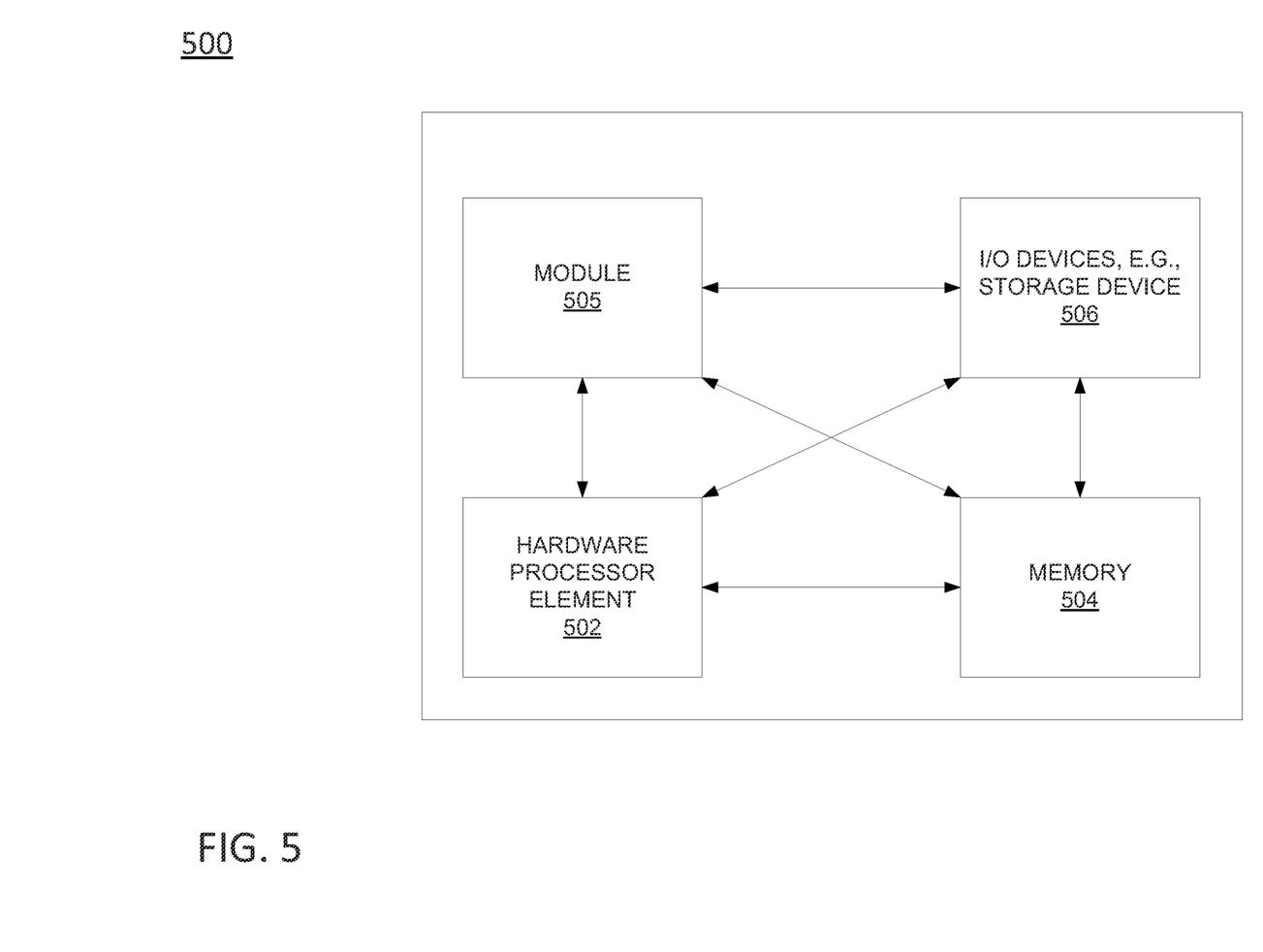
FIG. 5 illustrates a high level block diagram of a computing device specifically programmed to perform the steps, functions, blocks and/or operations described herein.

In one example, any one or more of devices 110 and 112, or electronic identification tag 151 may comprise a computing device or processing system, such as computing system 500 depicted in FIG. 5, and may be configured to provide one or more operations or functions in connection with examples of the present disclosure for presenting at least one visual indicator associated with a stowage bin in response to detecting that a luggage item is proximate to the stowage bin via an identifier of the luggage item obtained via a wireless signal from the luggage item. A flowchart of an example method 400 for presenting at least one visual indicator associated with a stowage bin in response to detecting that a luggage item is proximate to the stowage bin via an identifier of the luggage item obtained via a wireless signal from the luggage item is illustrated in FIG. 4 and discussed in greater detail below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

Similarly, server(s) 114 each comprise a computing system or server, such as computing system 500 depicted in FIG. 5, and may be configured to perform operations in connection with examples of the present disclosure for presenting at least one visual indicator associated with a stowage bin in response to detecting that a luggage item is proximate to the stowage bin via an identifier of the luggage item obtained via a wireless signal from the luggage item, e.g., as described in connection with FIG. 4. For instance, server(s) 114 may provide a luggage item management system and/or a carrier reservation system in accordance with the present disclosure. In one example, server(s) 114 may represent one or more distributed file systems, e.g., a Hadoop® Distributed File System (HDFS™), or the like. Server(s) 114 may receive and store information regarding luggage items, electronic identification tags, and users/passengers associated with such electronic identification tags and/or luggage items. In addition, server(s) 114 may associate the luggage items, electronic identification tags, and/or users/passengers with particular reservations, e.g., reservations for luggage item stowage locations on-board carrier transport vehicles for specific trips (e.g., specific flights of specific aircraft, specific voyages of specific ships, specific trips of specific trains or buses, etc.).

In one example, AS 104 may comprise a network-based server (or servers) providing a luggage item management system. In this regard, AS 104 may comprise the same or similar components as those of server(s) 114 and may provide the same or similar functions, or at least a portion thereof. For instance, an operator of network 102 may provide a luggage item management service via AS 104 in accordance with the present disclosure (e.g., in addition to telecommunication services such as TV, phone, internet access, etc., as described above). For example, AS 104 may store data related to users, their luggage items, and/or their electronic identification tags for luggage items (e.g., user 140, luggage item 150, and electronic identification tag 151) such as: a user identifier (ID), an ID of the luggage item, a description of the luggage item, exterior dimensions of the luggage item, color of the luggage item, maximum weight capacity of the luggage item, and other data, such as whether the luggage item is rigid or compactible to a degree. In one example, AS 104 may provide such data to an airline or other carriers in connection with particular trips of the user 140. For instance, when user 140 books a trip with a carrier associated with server(s) 114, AS 104 may provide profile information of luggage item 150 and electronic identification tag 151 to server(s) 114. This information may be associated with a particular reservation for user 140, as described above.

As illustrated in FIG. 1, server 116 may comprise an on-board computing system (e.g., a processing system) of an aircraft 170. The aircraft 170 (e.g., a carrier transport vehicle) may be operated by and/or otherwise associated with a carrier, which may maintain reservations, passenger data, luggage item data, and so forth, e.g., in server(s) 114. In one example, information relating to a flight may be loaded from server(s) 114 to server 116, such as a passenger manifest (e.g., records/data relating to passengers having reserved transport on the flight), a cargo manifest, a carry-on luggage item manifest, and so forth. With respect to a carry-on luggage item manifest, the relevant information may include luggage item profile data, such as, for each luggage item: a user identifier (ID), an ID of the luggage item (and/or a tag ID of an electronic identification tag associated with the luggage item), a description of the luggage item, exterior dimensions of the luggage item, color of the luggage item, maximum weight capacity of the luggage item, and other data such as whether the luggage item is rigid or compactible to a degree, and so forth. In addition, the carry-on luggage item manifest may also associate luggage items with reserved locations, e.g., stowage bins, of the aircraft 170.

In one example, user 140 may board aircraft 170 at a designated boarding time, and may approach a bin 180, which may have been reserved by or for the luggage item 150 of the user 140. For instance, the user may have selected the specific bin 180 during a booking process via an application provided by the airline, during check-in at the airport, or in a different manner (such as through a travel agent, etc.). In another example, the user 140 may have selected from a class or level of stowage accommodation, from which server(s) 114 may have selected bin 180 to be reserved for the luggage item 150. In accordance with the present disclosure bin 180 (as well as other bins/stowage locations) of aircraft 170 may include components which support peer-to-peer and/or short range wireless communications, e.g., IEEE 802.11 based communications (e.g., Wi-Fi, Wi-Fi Direct), IEEE 802.15 based communications (e.g., Bluetooth, Bluetooth Low Energy (BLE), and/or ZigBee communications), LTE Direct, Dedicated Short Range Communications (DSRC), e.g., in the 5.9 MHz band, or the like. Thus, for example bin 180 may comprise a wireless beacon, or wireless access point to perform local proximity sensing and/or communication with electronic identification tag 151 such as via IEEE 802.15 communications (e.g., Bluetooth), 802.11 communications (e.g., Wi-Fi Direct), etc. In one example, each bin of aircraft 170 may include an independent processing system that may be provided with information regarding a reserved luggage item, and that may sense the electronic identification tag of the respective luggage item and provide a visual indicator to assist in the correct placement of the respective luggage item(s) in the bin. However, in another example, each bin may include a wireless beacon comprising an RFID scanner that is able to scan/sense electronic identification tags of luggage items and to forward such information to server 116 for processing. Server 116 may then control other components of aircraft 170 to provide visual indicators for the correct stowage of luggage items.

To illustrate, bin 180 may periodically and/or on an ongoing basis scan for nearby electronic identification tags. In this way, bin 180 may detect electronic identification tag 151 when luggage item 150 is proximate (e.g., within a scanning range, within a range that a received signal strength from electronic identification tag 151 is above a threshold, etc.). The bin 180 may for example obtain a tag ID of the electronic identification tag 151, and may provide the tag ID to server 116. Server 116 may look-up the tag ID in the carry-on luggage item manifest and may determine that bin 180 is reserved for luggage item 150. Accordingly, server 116 may cause a visual indicator to be provided to indicate that bin 180 is the correct stowage location for luggage item 150. In one example, the visual indicator may be provided by illuminating bin 180. For instance, server 116 may cause a light source 181 (e.g., an incandescent light bulb, a light emitting diode, a projector, or the like) to illuminate bin 180. In one example, the illumination may increase in an intensity based upon a distance between the bin 180 and the luggage item 150. In one example, the light source 181 may provide a colored light (e.g., a green light), where particular color may be indicative that the correct luggage item (e.g., luggage item 150) is proximate (e.g., a red light indicating the luggage item is still far away, an orange light indicating that the luggage item is approaching, and a green light indicating that the luggage item is immediately proximate to the bin). Conversely, a different color may be presented via light source 181 (e.g., an LED light source) if an incorrect luggage item is attempted to be placed in the bin 180.

In one example, bin 180 may alternatively or additionally include a display (not shown) that may present a name of the user 140, a descriptor of the luggage item 150, or other information to help identify that bin 180 is the correct stowage location of luggage item 150, in response to detecting/sensing the electronic identification tag 151 of luggage item 150. The display may comprise a projector (e.g., a miniature projector that may illuminate a portion of bin 180 with textual, pictorial, or other information or a display screen, such as an LED screen). Alternatively, or in addition, server 116 may cause a visual indicator to be presented via an AR endpoint device, such as AR endpoint device 191 of user 192 (e.g., a carrier personnel or a flight attendant). For instance, server 116 may provide an instruction to AR endpoint device 191 to cause AR endpoint device 191 to present an illumination, textual, pictorial, or other information indicating that bin 180 is the correct stowage location for luggage item 150. For instance, AR endpoint device 191 may project a visual indicator as a visual overlay on the bin 180. For instance, the bin 180 may comprise an AR marker to enable AR endpoint device 191 to determine the correct position and orientation to place the visual indicator within a field of view of user 192. It should be noted that AR endpoint device 191 may be used by user 192 (e.g., carrier personnel or a flight attendant) to assist the user 140 in stowing the luggage item 150 and/or for pre-stowing the luggage item 150 as an additional service. However, in another example, an AR visual indicator may alternatively or additionally be provided to an endpoint device of user 140, e.g., device 110. For example, the AR visual indicator may comprise a presentation on a display screen of device 110, where image/video is captured and then re-presented with an overlaid visual indicator on a screen of device 110.

It should be noted that the foregoing describes just one illustrative scenario of how the system 100 may be used in connection with examples of the present disclosure for presenting at least one visual indicator associated with a stowage bin in response to detecting that a luggage item is proximate to the stowage bin via an identifier of the luggage item obtained via a wireless signal from the luggage item. In addition, further details, such as example user interface aspects are illustrated in FIGS. 2 and 3.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server 114 and server 116 may reach network 102 via different access networks, devices 110 and 112 may reach network 102 via different access networks, and so forth. It should also be noted that although FIG. 1 and other examples herein are illustrated and described primarily in connection with aircraft stowage bins, it should be noted that other, further, and different examples may similarly relate to stowage locations of trains, buses, ships, or other carrier transport vehicles. Thus, these and other modifications are all contemplated within the scope of the present disclosure.

Figure 2:
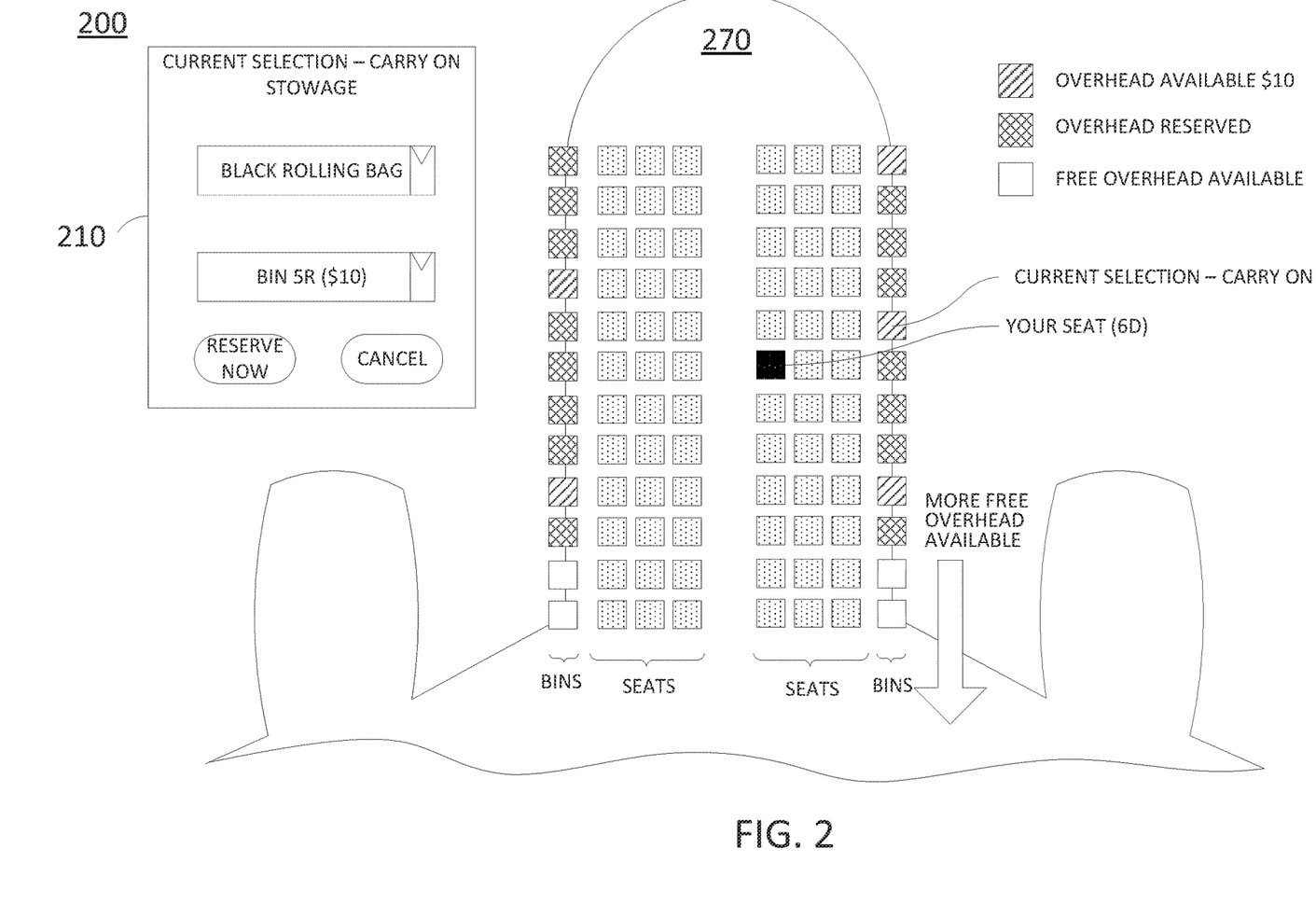
FIG. 2 illustrates an example user interface for reserving stowage locations for luggage items, in accordance with the present disclosure.

To further illustrate aspects of the present disclosure, FIG. 2 depicts an example user interface 200 for reserving stowage locations for luggage items. For instance, user interface 200 may be part of a carrier app provided by an airline that may be utilized by a passenger via his or her mobile device or other computing devices. In the example of FIG. 2, the user interface 200 includes a layout of aircraft 270 with representation of available and/or reserved passenger seats, as well as stowage bins (or simply "bins") with further indications of those that are free/available and those that are already reserved by others. In the current example, a user may have already reserved seat 6D, as indicated by the user interface 200. In addition, the user may be searching for and/or making a selection of a stowage location for the user's "black rolling bag." For instance, this is indicated by the selection dialog window 210. Continuing with the present example, the user may have made an initial selection of "bin 5R" (e.g., row 5, right-side of aircraft) for a stowage location of the "black rolling bag." The user interface 200 may indicate that the cost is $10, and the selection dialog window 210 may provide two buttons to either "reserve now" or "cancel" the selection. Thus, for instance, if the user selects the "reserve now" button, bin 5R may be reserved for the luggage item. For example, a reservation database of the carrier may be updated to indicate that bin 5R for the respective flight (or at least a slot/space of bin 5R) is reserved, and to also record that the particular luggage item is holding the reservation. For instance, the reservation database may record the tag ID of the electronic identification tag associated with the luggage item, and may further record any additional information that may be available and/or which the carrier may choose to record based upon the configuration of the reservation system. For example, the carrier may also choose to record information regarding luggage item dimensions, color, weight (if available), compressibility, and so forth. It should be noted that the user interface 200 is just one example of a user interface that may provide for booking/reserving stowage locations for luggage items in connection with services of carrier transport vehicles. Thus, various other user interfaces of a same or similar nature may be provided in other, further, and different examples with respect to different types of carrier transport vehicles, different carriers, and so on.

Figure 3:
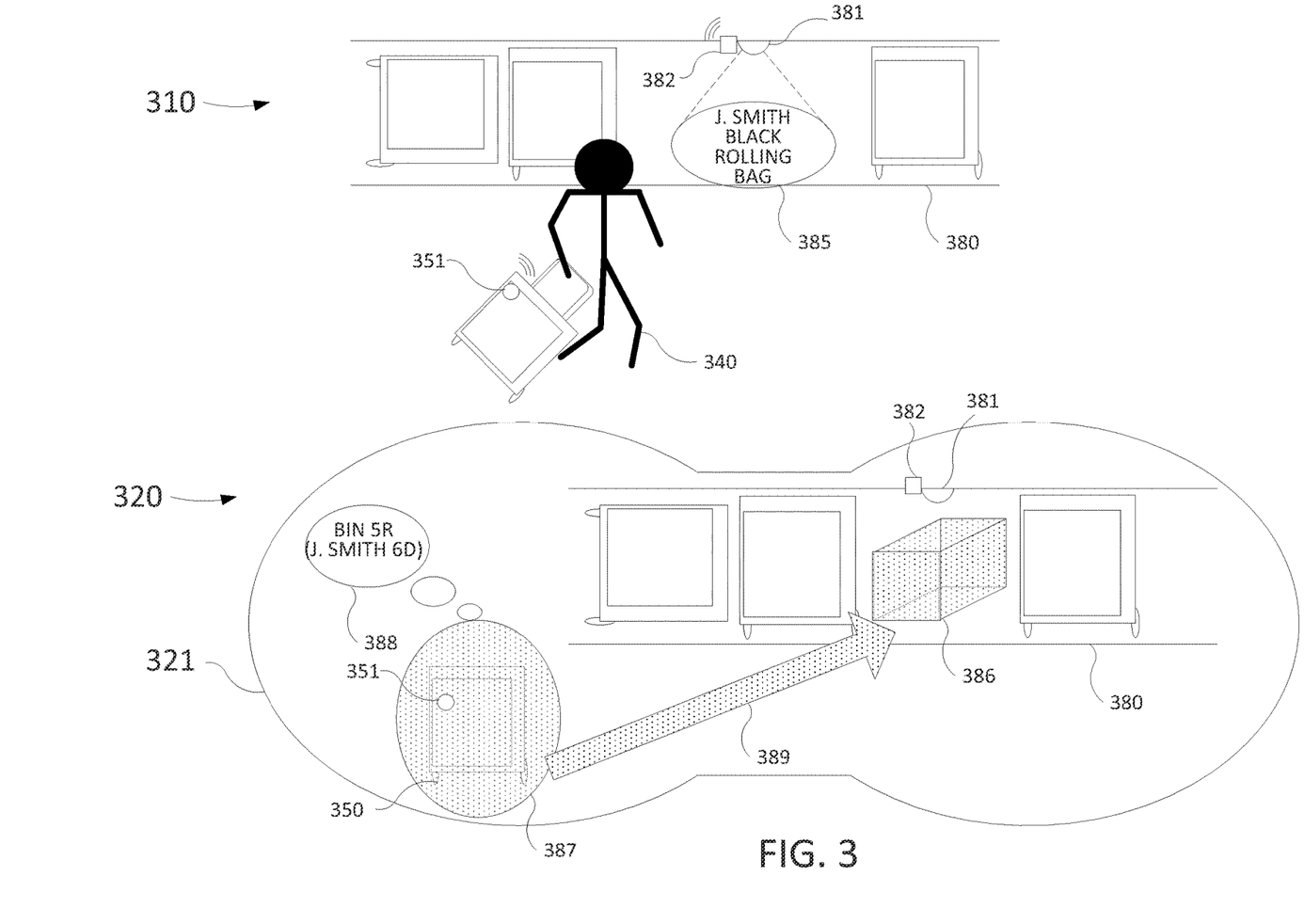
FIG. 3 illustrates an example of providing visual indicators for stowage locations reserved for luggage items having electronic identification tags, in accordance with the present disclosure.

FIG. 3 illustrates examples of providing visual indicators for stowage locations in accordance with the present disclosure. In particular, a first example 310 illustrates a user 340 approaching an overhead stowage bin 380 that is reserved for luggage item 350. The luggage item 350 includes an electronic identification tag 351 which may transmit a tag identifier (and in one example, additional information regarding luggage item 350 and/or user 340). For instance, electronic identification tag 351 may periodically broadcast such data, or may transmit such data in response to a scan from scanner/beacon 382 of the bin 380. Upon a processing system of the bin 380, or a processing system of the aircraft in communication with scanner/beacon 382 determining that luggage item 350 is the correct luggage item with a reservation for the bin 380 (or at least a slot/space within bin 380) the processing system may cause the visual indicator 385 to be presented via a light source 381. In one example, the light source may comprise an incandescent light bulb, a light emitting diode (LED), a projector, or the like to illuminate bin 380. In one example, the illumination may increase in an intensity based upon a distance between the bin 380 and the luggage item 350, e.g., as determined via the signal strength of electronic identification tag 351 as detected by scanner/beacon 382. In one example, the light source 381 may provide a colored light, wherein a particular color may be indicative that the correct luggage item (e.g., luggage item 350) is proximate. Conversely, a different color may be presented via light source 381 if an incorrect luggage item is attempted to be placed in the bin 380.

In one example, bin 380 may alternatively or additionally include a display (not shown), such as an LED display screen, that may present a name of the user 380, a descriptor of the luggage item 350, or other information to help identify that bin 380 is the correct stowage location of luggage item 350, in response to detecting/sensing the electronic identification tag 351 of luggage item 350. However, as noted above, in one example, the light source may comprise a projector that may illuminate a portion of bin 380 with textual, pictorial, or other information. For instance, as illustrated in the example 310 of FIG. 3, the information "J. Smith—black rolling bag" may be projected by light source 381.

FIG. 3 illustrates a second example 320 in which an AR endpoint device may provide an AR-enhanced view 321 of bin 380. For instance, a processing system of the bin 380, or a processing system of the aircraft in communication with scanner/beacon 382 may scan/sense electronic identification tag 351 via the scanner/beacon 382 and determine that luggage item 350 is proximate to the reserved stowage location in bin 380. In such case, the processing system may communicate with the AR endpoint device (e.g., via the scanner/beacon 382 or other wireless access points of an on-board wireless network) to cause the AR endpoint device to provide a visual overlay 386 indicating the correct location for luggage item 350 in bin 380. In one example, the bin 380 may include an AR marker to enable the AR endpoint device to determine the correct size, position, and orientation to place the visual overlay within the field of view 321. In addition, in one example, the AR endpoint device may independently sense/scan the electronic identification tag 351, which may enable the AR endpoint device to provide an additional visual overlay 387 to help associate the correct luggage item (luggage item 350) with the location indicated by visual overlay 386 in bin 380. In one example, an arrow 389 or similar visual aid may also be projected in the field of view 321 to provide additional guidance for having the luggage item 350 stowed in the proper location in bin 380. Alternatively or in addition, the AR endpoint device may provide additional information, e.g., in text bubble 388 or the like, such as the bin location (e.g., "bin 5R") the associated passenger identity and the passenger's seat assignment (e.g., J. Smith, seat 6D), and so on.

In one example, the projection of visual information, and the types and locations of such visual information may be determined by an on-board processing system of bin or the aircraft (or other carrier transport vehicle) and communicated to the AR device. It should be noted that in one example, the visual overlay 386 may provide an outline indicating the proper orientation of the luggage item 350 within the space, e.g., for optimal packing efficiency, weight distribution, etc. as calculated according to a predetermined stowage plan. It should also be noted that FIG. 3 illustrates just two examples of how visual indicators may be provided for directing luggage items to proper reserved stowage locations in accordance with electronic identification tags of luggage items as described herein. For instance, various other AR interfaces of a same or similar nature may be provided in other, further, and different examples with respect to different types of carrier transport vehicles and/or different carriers, different AR endpoint devices with different components and capabilities, and so on.

FIG. 4 illustrates a flowchart of an example method 400 for presenting at least one visual indicator associated with a stowage bin in response to detecting that a luggage item is proximate to the stowage bin via an identifier of the luggage item obtained via a wireless signal from the luggage item, in accordance with the present disclosure. In one example, the method 400 is performed by a server on-board a carrier transport vehicle such as server 116 of FIG. 1, or any one or more components thereof, or by any one or more of such servers in conjunction with one another and/or in conjunction with other devices and/or components of system 100 of FIG. 1, e.g., server(s) 114, bin 180, light source 181, electronic identification tag 151, and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system (e.g., of a carrier transport vehicle) obtains a notification of a luggage item to be placed in a stowage bin of the carrier transport vehicle, the notification including an identifier of the luggage item. For example, the processing system may obtain at least a tag identifier (ID) of an electronic identification tag of the luggage item. For instance, the luggage item may comprise the electronic identification tag (e.g., embedded, contained within, affixed, or attached to the luggage item, etc.). In one example, the electronic identification tag comprises an RFID tag (e.g., a passive RFID tag). The notification may be obtained from a computing system associated with an operator of the carrier transport vehicle, e.g., a reservation system.

At step 420, the processing system detects, via the identifier of the luggage item that the luggage item is proximate to the stowage bin, where the identifier of the luggage item is obtained via a wireless signal from the luggage item. For instance, the bin may include or be associated with a transceiver (e.g., a wireless beacon/access point) to detect a transmission from an electronic identification tag of the luggage item. In one example, the detection of the luggage item may be via an RFID scanner to scan/sense the electronic identification tag of the luggage item. For instance, the luggage item may include an RFID tag (e.g., having a transponder or transceiver) to be detected by the bin transceiver. In one example "proximate" can be a specific threshold distance (e.g., within 5 meters, within 4 meters, 3 meters, etc.) or may be based upon a detected signal strength (e.g., by RFID scan, or the like) exceeding a threshold.

At step 430, the processing system presents at least one visual indicator associated with the stowage bin, in response to detecting that the luggage item is proximate to the stowage bin. In one example, the at least one visual indicator is indicative that the bin is reserved for the luggage item. For instance, the at least one visual indicator may comprise an illumination of the stowage bin. In one example, the illumination may increase in an intensity based upon a distance between the stowage bin and the luggage item. In one example, the at least one visual indicator may alternatively or additionally comprise a colored light of at least a first color (e.g., green to indicate a correct placement). In addition, in one example, a colored light of at least a second color may be presented in response to detecting another luggage item, where the at least the second color is different from the at least the first color. For instance, the at least the second color may be indicative that an incorrect luggage item is being placed in the bin (e.g., red to indicate an incorrect placement).

In one example, the at least one visual indicator may comprise a text display indicating a name of a passenger associated with the luggage item and/or at least one descriptor of the luggage item, and so forth. It should be noted that in one example, for a name display, the visual indicator may be temporary so as to not unnecessarily display a user's personal information for the duration of a journey. For instance, some passengers may prefer that their names are generally not on display for strangers, but appreciate the positive indication provided by their names when placing luggage items in stowage bins. As described above, the text display may comprise a projection on the stowage bin or may be presented via a display screen associated with the stowage bin.

In another example, the at least one visual indicator may alternatively or additionally comprise projecting the at least one visual indicator as a visual overlay on the stowage bin via an AR endpoint device. In such case, step 430 may comprise transmitting an instruction to the AR endpoint device, e.g., where the AR endpoint device is in communication with the processing system. For instance, the instruction may be communicated via a beacon/access point of the stowage bin or associated with the stowage bin, or a different access point available to connect to a wireless network of the carrier transport vehicle. In one example, the visual indicator can be projected into a user's field of view via an AR headset, or via presentation on a display screen where image/video is captured and then represented with an overlaid visual indicator. In this regard, it should be noted that the stowage bin may comprise one or both of a wireless beacon or an augmented reality marker. In one example, the at least one visual indicator may comprise an outline of suggested placement of the luggage item. For instance, the booking/reservation may provide luggage item data, such as shape, dimensions, etc., and then the AR visual overlay may provide an indication of how the luggage item is to be placed in the stowage bin. For example, often passengers place carry-on items inefficiently in stowage bins, taking up unnecessary space that could be used for other passengers' items. In an example where both a passenger and carrier personnel have AR endpoint devices, the processing system may provide different visual indicators for the passenger and for carrier personnel. For instance, carrier personnel AR endpoint devices may be provided with visual indicators of stowage bins that can indicate that multiple and/or all luggage items are in the correct stowage bins.

Following step 430, the method 400 proceeds to step 495. At step 495 the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-430 for additional luggage items, additionally stowage bins, additional trips of a carrier transport vehicle, and so on. In one example, the method 400 may be expanded to provide an additional notification, e.g., to the luggage item (or the electronic identification tag thereof) of the stowage bin that is reserved for the luggage item. In addition, in such an example, the electronic identification tag may include a display to present at least a second visual indicator in response to the electronic identification tag detecting the stowage bin (e.g., using a higher intensity light, light of changing color or an audible sounds sent to a pair of earbuds of the user, to indicate it is getting closer (or further away) from the correct stowage bin).

It should again be noted that in one example, the electronic identification tag may be owned, controlled, and/or provided by the passenger having the luggage item. However, in another example, the electronic identification tag can be provided by a carrier to the passenger to affix to the luggage item. For example, a carry-on and/or cargo manifest may be provided by the carrier to the processing system (e.g., an on-board computing system of the carrier transport vehicle) at step 410. The on-board computing system can then detect via the RFID tags affixed to luggage items when the luggage items approach the appropriate bins (e.g., per step 420) and provide the visual indicators accordingly (e.g., per step 430). Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step.

Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components or devices illustrated in FIG. 1, or described in connection with FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for presenting at least one visual indicator associated with a stowage bin in response to detecting that a luggage item is proximate to the stowage bin via an identifier of the luggage item obtained via a wireless signal from the luggage item, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for presenting at least one visual indicator associated with a stowage bin in response to detecting that a luggage item is proximate to the stowage bin via an identifier of the luggage item obtained via a wireless signal from the luggage item (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for presenting at least one visual indicator associated with a stowage bin in response to detecting that a luggage item is proximate to the stowage bin via an identifier of the luggage item obtained via a wireless signal from the luggage item (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. An apparatus comprising:
a processor; and
a computer-readable medium storing instruction that, when executed by the processor when deployed in a carrier transport vehicle, cause the processor to perform operations, the operations comprising:
obtaining a notification of a luggage item to be placed in a stowage bin of the carrier transport vehicle, the notification including an identifier of the luggage item;
detecting, via the identifier of the luggage item, that the luggage item is proximate to the stowage bin, wherein the identifier of the luggage item is obtained via a wireless signal from the luggage item; and
presenting at least one visual indicator associated with the stowage bin, in response to the detecting that the luggage item is proximate to the stowage bin, wherein the presenting the at least one visual indicator comprises projecting the at least one visual indicator as a visual overlay on the stowage bin via an augmented reality endpoint device, wherein the presenting the at least one visual indicator comprises transmitting an instruction to the augmented reality endpoint device, wherein the luggage item comprises an electronic identification tag, wherein the electronic identification tag is provided, via a wireless transceiver of the electronic identification tag, with an additional notification of an identifier of the stowage bin that is reserved for the luggage item, wherein the stowage bin comprises at least one of: a wireless beacon or an augmented reality marker, wherein the electronic identification tag presents at least a second visual indicator on a display of the electronic identification tag in response to the electronic identification tag detecting the stowage bin.

2. The apparatus of claim 1, wherein the at least one visual indicator is indicative that the stowage bin is reserved for the luggage item.

3. The apparatus of claim 1, wherein the at least one visual indicator comprises an illumination of the stowage bin.

4. The apparatus of claim 3, wherein the illumination increases in an intensity based upon a distance between the stowage bin and the luggage item.

5. The apparatus of claim 1, wherein the at least one visual indicator comprises a colored light of at least a first color.

6. The apparatus of claim 5, wherein a colored light of at least a second color is presented in response to detecting another luggage item, wherein the at least the second color is different from the at least the first color.

7. The apparatus of claim 6, wherein the at least the second color is indicative that an incorrect luggage item is being placed in the stowage bin.

8. The apparatus of claim 1, wherein the at least one visual indicator comprises a text display indicating at least one of:
a name of a passenger associated with the luggage item; or
at least one descriptor of the luggage item.

9. The apparatus of claim 8, wherein the text display comprises a projection on the stowage bin or is presented via a display screen associated with the stowage bin.

10. The apparatus of claim 1, wherein the augmented reality endpoint device is an endpoint device of a passenger associated with the luggage item or an endpoint device of a personnel of the carrier transport vehicle.

11. The apparatus of claim 1, wherein the electronic identification tag comprises a radio frequency identification tag.

12. The apparatus of claim 1, wherein the notification is obtained from a computing system associated with an operator of the carrier transport vehicle.

13. The apparatus of claim 1, further comprising at least one of:
the stowage bin;
the wireless beacon to detect the luggage item via the wireless signal from the luggage item;
a light source to present the at least one visual indicator; or
a projector to present the at least one visual indicator.

14. A non-transitory computer-readable medium storing instructions that, when executed by a processor of a carrier transport vehicle, cause the processor to perform operations, the operations comprising:
obtaining a notification of a luggage item to be placed in a stowage bin of the carrier transport vehicle, the notification including an identifier of the luggage item;
detecting, via the identifier of the luggage item, that the luggage item is proximate to the stowage bin, wherein the identifier of the luggage item is obtained via a wireless signal from the luggage item; and
presenting at least one visual indicator associated with the stowage bin, in response to the detecting that the luggage item is proximate to the stowage bin, wherein the presenting the at least one visual indicator comprises projecting the at least one visual indicator as a visual overlay on the stowage bin via an augmented reality endpoint device, wherein the presenting the at least one visual indicator comprises transmitting an instruction to the augmented reality endpoint device, wherein the luggage item comprises an electronic identification tag, wherein the electronic identification tag is provided, via a wireless transceiver of the electronic identification tag, with an additional notification of an identifier of the stowage bin that is reserved for the luggage item, wherein the stowage bin comprises at least one of: a wireless beacon or an augmented reality marker, wherein the electronic identification tag presents at least a second visual indicator on a display of the electronic identification tag in response to the electronic identification tag detecting the stowage bin.

15. A method comprising:
obtaining, by a processor of a carrier transport vehicle, a notification of a luggage item to be placed in a stowage bin of the carrier transport vehicle, the notification including an identifier of the luggage item;
detecting, by the processor via the identifier of the luggage item, that the luggage item is proximate to the stowage bin, wherein the identifier of the luggage item is obtained via a wireless signal from the luggage item; and
presenting, by the processor, at least one visual indicator associated with the stowage bin, in response to the detecting that the luggage item is proximate to the stowage bin, wherein the presenting the at least one visual indicator comprises projecting the at least one visual indicator as a visual overlay on the stowage bin via an augmented reality endpoint device, wherein the presenting the at least one visual indicator comprises transmitting an instruction to the augmented reality endpoint device, wherein the luggage item comprises an electronic identification tag, wherein the electronic identification tag is provided, via a wireless transceiver of the electronic identification tag, with an additional notification of an identifier of the stowage bin that is reserved for the luggage item, wherein the stowage bin comprises at least one of: a wireless beacon or an augmented reality marker, wherein the electronic identification tag presents at least a second visual indicator on a display of the electronic identification tag in response to the electronic identification tag detecting the stowage bin.

16. The method of claim 15, wherein the at least one visual indicator is indicative that the stowage bin is reserved for the luggage item.

17. The method of claim 15, wherein the at least one visual indicator comprises an illumination of the stowage bin.

18. The method of claim 17, wherein the illumination increases in an intensity based upon a distance between the stowage bin and the luggage item.

19. The method of claim 15, wherein the at least one visual indicator comprises a colored light of at least a first color.

20. The method of claim 19, wherein a colored light of at least a second color is presented in response to detecting another luggage item, wherein the at least the second color is different from the at least the first color.

* * * * *